(12) United States Patent
Gollier (10) Patent No.: US 8,094,355 B2
(45) Date of Patent: Jan. 10, 2012

(54) LASER PROJECTION SYSTEM WITH A SPINNING POLYGON FOR SPECKLE MITIGATION

(75) Inventor: Jacques Gollier, Painted Post, NY (US)

(73) Assignee: Corning Incorporated, Corning, NY (US)

(*) Notice: Subject to any disclaimer, the term of this patent is extended or adjusted under 35 U.S.C. 154(b) by 225 days.

(21) Appl. No.: 12/431,989

(22) Filed: Apr. 29, 2009

(65) Prior Publication Data
US 2010/0277702 A1    Nov. 4, 2010

(51) Int. Cl.
G02B 26/08    (2006.01)
(52) U.S. Cl. ........................ 359/211.2; 353/81
(58) Field of Classification Search ................ None
See application file for complete search history.

(56) References Cited

U.S. PATENT DOCUMENTS

| | | | | |
|---|---|---|---|---|
| 5,148,310 A * | 9/1992 | Batchko | ........................ | 359/479 |
| 5,313,479 A | 5/1994 | Florence | ........................ | 372/26 |
| 6,081,381 A | 6/2000 | Shalapenok et al. | .......... | 359/619 |
| 6,154,259 A | 11/2000 | Hargis et al. | ................... | 348/756 |
| 6,314,651 B1 | 11/2001 | Ohtomo et al. | ................ | 33/290 |
| 6,577,429 B1 | 6/2003 | Kurtz et al. | ..................... | 359/279 |
| 6,594,090 B2 | 7/2003 | Kruschwitz et al. | .......... | 359/707 |
| 6,738,105 B1 | 5/2004 | Hannah et al. | ................. | 348/745 |
| 6,747,781 B2 | 6/2004 | Trisnadi | ........................ | 359/279 |
| 6,758,564 B2 * | 7/2004 | Ferguson | ..................... | 351/221 |
| 6,863,216 B2 | 3/2005 | Tsikos et al. | .............. | 235/462.01 |
| 6,870,650 B2 | 3/2005 | Kappel et al. | .................... | 359/15 |
| 6,874,893 B2 | 4/2005 | Park | ................................ | 353/84 |
| 6,952,435 B2 | 10/2005 | Lai et al. | ........................... | 372/9 |
| 2006/0001780 A1 | 1/2006 | Ahn et al. | ...................... | 348/744 |
| 2006/0109553 A1 | 5/2006 | Serafimovich et al. | ....... | 359/565 |
| 2006/0238743 A1 | 10/2006 | Lizotte et al. | ................ | 356/28.5 |
| 2006/0250532 A1 | 11/2006 | Shin | ................................... | 349/6 |
| 2007/0268458 A1 * | 11/2007 | Lee et al. | ......................... | 353/31 |
| 2008/0048979 A1 | 2/2008 | Ruttenberg | .................... | 345/158 |

FOREIGN PATENT DOCUMENTS

| | | |
|---|---|---|
| WO | 2005/041423 | 5/2005 |
| WO | 2005/062114 | 7/2005 |
| WO | 2005/098532 | 10/2005 |
| WO | 2006/137326 | 12/2006 |

OTHER PUBLICATIONS

Trisnadi; "Speckle contrast reduction in laser projection displays"; Proceedings of SPIE; vol. 4657 (2002); p. 131-137.
Trisnadi; "Hadamard speckle contrast reduction"; 2004 Optical Society of America; Optics Letters; Jan. 1, 2004/vol. 29, No. 1; p. 11-13.
Kasazumi et al; "A practical laser projector with new illumination optics for reduction of speckle noise"; Japanese Journal of Applied Physics; vol. 43, No. 8B; 2004, p. 5904-5906.
Wang et al; "Speckle reduction in laser projections with ultrasonic waves"; Opt. Eng. 39(6) (Jun. 2000); p. 1659-1164.
Wang et al; "Speckle reduction in laser projection systems by diffractive optical elements"; Applied Optics; vol. 37, No. 10; Apr. 1, 1998; p. 1770-1775.

* cited by examiner

*Primary Examiner* — Jennifer L. Doak
(74) *Attorney, Agent, or Firm* — Svetlana Z. Short (57) ABSTRACT

A laser projection system comprises: (i) a coherent light source including at least one laser configured to emit an output beam carrying signal data; (ii) a scanning optics, the scanning optics comprising at least one scanning reflector, the scanning reflector positioned in an optical path of the output beam; and (iii) a rotating polygon prism; wherein (a) the scanning reflector is configured to direct the output beam towards the polygon prism and scan the output beam across a projection surface; and (b) the polygon prism is configured to transmit the scanned output beam through its body, and create a virtual image of the scanning reflector, such that said virtual image of the scanning reflector is moving when said polygon prism rotates.

20 Claims, 5 Drawing Sheets

LASER PROJECTION SYSTEM WITH A SPINNING POLYGON FOR SPECKLE MITIGATION

BACKGROUND OF THE INVENTION

1. Field of the Invention

The present invention relates generally to laser projection systems, and, more specifically, to laser projection systems that reduce the appearance of speckle that may be visible in a laser projection image.

2. Technical Background

Speckle may result whenever a coherent light source is used to illuminate a rough surface, for example, a screen, wall, or any other object that produces a diffused reflection or transmission. Particularly, a multitude of small areas of the screen or other reflecting objects scatter light into a multitude of reflected beams with different points of origination and different propagation directions. Speckle causes high spatial frequency noise in the projected image. At an observation point, for example in the eyes of an observer or at the sensor of a camera, these beams interfere constructively to form a bright spot, or destructively to form a dark spot, producing a random granular intensity pattern known as speckle. Speckle may be characterized by grain size and contrast, usually defined as a ratio of standard deviation to mean light intensity in the observation plane. For a large enough illuminated area and a small enough individual scattering point size, the speckle will be "fully developed," with a brightness standard deviation of 100%. If an image is formed on the screen using a coherent light source such as laser beams, such granular structure will represent noise or a serious degradation of the image quality. This noise presents a significant problem, particularly when the projector is used to display high spatial frequency content, such as text.

A general concept of minimizing speckle contrast in an image consists of projecting an intermediate scanned laser image over a small sized diffusing surface, and using projection optics to project that intermediate scanned laser image toward the final projection surface. By rapidly moving the diffuser, the phase of the electric field is scrambled over time, which results in changing the perceived speckle pattern. If the diffuser is moving or vibrating fast enough, the perceived speckle pattern changes at high frequencies and are averaged in time by the eye. To reduce speckle efficiently, multiple speckle frames need to be created over the integration time of the eye.

Although rapidly moving the diffuser provides speckle reduction, it requires expensive and complicated mechanisms to move the phase mask laterally at a relatively high speed. Further, a moving diffuser requires the use of the diffuser such as the auto-focus mechanisms as well as lenses possessing a high numerical aperture and a high field of view, which adds significant complexity and cost to the system.

SUMMARY OF THE INVENTION

According to one embodiment of the invention a laser projection system comprises:
(i) a coherent light source including at least one laser configured to emit an output beam carrying signal data;
(ii) a scanning optics, the scanning optics comprising at least one scanning reflector, the scanning reflector positioned in the optical path of the output beam; and
(iii) a rotating polygon prism; wherein
  (a) the scanning reflector is configured to direct the output beam towards the polygon prism and scan the output beam across a projection surface; and
  (b) the polygon prism is configured to transmit the scanned output beam through its body, and create a virtual image of the scanning reflector, such that said virtual image of the scanning reflector is moving when the polygon prism rotates.

According to some embodiments the coherent light source includes a plurality of lasers. According to some embodiments, the laser projection system includes a focusing lens (e.g., a lens component or a lens system), or/and image correction algorithm(s) to insure that the image frames are not affected by the rotation of the polygon prism. According to some embodiments, a controller, for example, a controller for moving the scanning reflector may incorporate such algorithm(s). This controller may be operatively connected to the laser(s), the scanning reflector and/or the polygon prism. According to one embodiment, the image correction algorithm induces a time delay between the signal provided to said at least one laser and the signal controlling the movement of the scanning reflector.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts. Particular embodiments of the present disclosure may be described in the context of a laser projection system that is configured to scan an output signal or beam across a projection surface to generate a two dimensional image. However, embodiments may be implemented in not only laser projection systems, but other optical systems utilizing coherent light sources where the reduction of speckle is desired.

Figure 1:
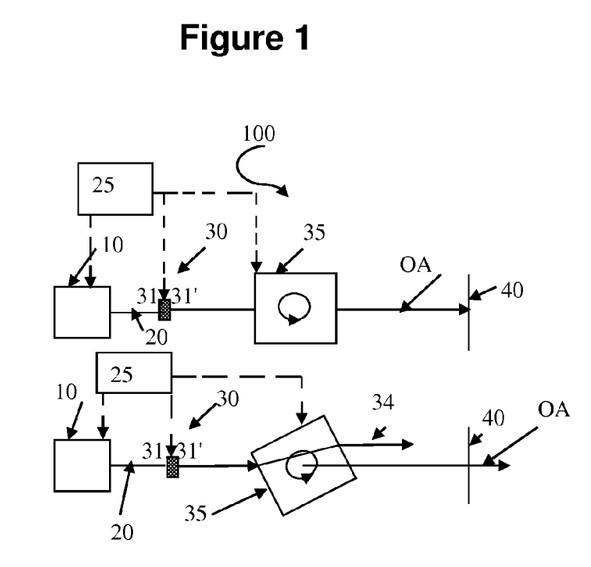
FIG. 1 is a schematic illustration of a top view of an exemplary laser projection system according to one or more embodiments.

One exemplary embodiment of the laser projection system of the present invention is shown in FIG. 1, and is designated generally throughout by the reference numeral 100.

In this embodiment, the exemplary laser projection system 100 is configured as a scanning laser projection system that is programmed to two-dimensionally scan an output beam 20 generated by a coherent light source 10 to create a two-dimensional image at a given projection surface 40. Preferably, the beam 20 is substantially collimated, with a beam diameter of 0.5 mm to 1.5 mm. The projection surface 40 may be, for example, a wall or a projector screen. The laser projection system 100 may be used to display static images (e.g., text), moving images (e.g., video) or both. The laser projection system 100 may be compact such that it may be incorporated into a relatively small device, for example, a handheld projector, cell phone, personal data assistant, notebook computer or other similar devices.

The light source 10 may comprise one or more lasers that are operable to emit coherent beams at different wavelengths. For example, the light source 10 may comprise three lasers capable of emitting beams of red, blue and green wavelengths, respectively. According to some embodiments, the output beam 20 is comprised of nearly or substantially collimated red, green and blue beams. Other embodiments may utilize a light source 10 that emits more or fewer nearly collimated laser beams, and/or beams at wavelengths other than red, blue or green.

The light source 10 may be comprised of one or more single-wavelength lasers, such as distributed feedback (DFB) lasers, distributed Bragg reflector (DBR) lasers, vertical cavity surface-emitting lasers (VCSEL), vertical external cavity surface-emitting lasers (VECSEL) or Fabry-Perot lasers, for example. Additionally, to generate a green beam, the light source 10 of some embodiments may also be comprised of a wavelength conversion device such as a second harmonic generating (SHG) crystal or a higher harmonic generating crystal to frequency-double a laser beam having a native wavelength in the infrared band. For example, a SHG crystal, such as an MgO-doped periodically poled lithium niobate (PPLN) crystal, may be used to generate green light by converting the wavelength of a 1060 nm DBR or DFB laser to 530 nm. The light source 10 may also be comprised lasers other than single wavelength lasers, such as lasers capable of emission of multiple wavelengths.

The laser projection system 100 may be programmed to perform many of the control functions disclosed herein as well as additional functions. The system 100 may be configured to be programmed in numerous ways, including conventional or yet-to-be-developed programming means. Examples of control algorithms discussed herein are not intended to limit the embodiments to any specific way of programming.

According to some embodiments, the laser projection system 100 may include one or more projection system controllers 25, for example microcontrollers that are programmed to control the light source 10 to generate a single or multi-color image data stream. The system controller, along with image projection software and associated electronics known in the art, may provide the light source with one or more image data signals (e.g., laser drive currents) that carry image data. To create the desired image, the light source 10 may then emit the encoded image data in the form of intensity variations of the output beam 20 (signal data). However, some embodiments may utilize another controller or other programming means to generate the scanned laser image.

Figure 2:
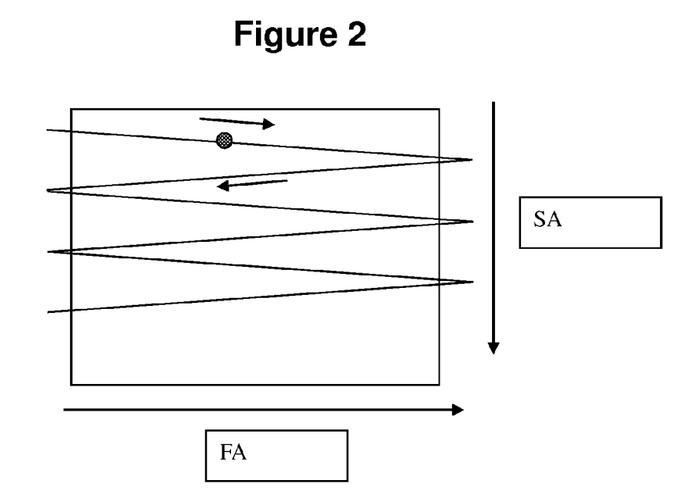
FIG. 2 is a schematic illustration an image scan generated on a projection surface.

Positioned within the optical path of the output beam 20 is scanning optics 30 or a scanning optics package comprising one or more scanning reflector(s) 31 such as a mirror 31'. It is contemplated that the drive mechanism of the scanning reflector 31 may be comprised of one or more controllable and movable micro-opto-electromechanical systems (MOEMS) or micro-electro-mechanical system (MEMS) operatively coupled to a mirror 31'. The laser projection system 100 is controlled such that the mirror 31' generates a translation of the laser beams 34 directed to the projection surface 40. FIG. 2 is an exemplary illustration of the laser beam's scan path onto the projection surface 40. (I.e., FIG. 2 illustrates schematically how the output beam's spot scans across the projection surface 40). The MOEMS or MEMS devices may be positioned and controlled to redirect the output beam 20 in the x and/or y direction via the scanning reflector(s) 31 and may be controlled via a drive signal provided by a projection system controller 25 or other conventional or yet to be developed drive electronics. The scanning reflector(s) 31 provides a two dimensional scan of a plurality of pixels defining an image frame. The image data signal may be provided by the projection system controller 25 or other electronics to vary the intensity of the output beam or beams 20 corresponding to the particular pixels within the generated frames. Thus, the laser projection system 100 shown in FIG. 1 is controlled to (i) provide the proper angle(s) of the scanning reflector 31 such that the light beam(s) 34 move across the projection surface 40 in a similar fashion to that shown in FIG. 2, and (ii) modulate the optical power of the output beam 20, in order to vary the illumination of the projection surface 40. By synchronizing the scanning angle(s) of the reflector 31 with the laser power modulation, it is possible to create good quality images on the projection screen 40.

As will be described below, the scanning optics 30 scans and projects a plurality of successive image frames from toward the projection surface 40.

According to one embodiment, the scanning reflector(s) 31 may be controlled to provide a two dimensional scan of a plurality of pixels defining an image frame. The image data signal may be provided by the system controller 25 or other software and/or electronics to vary the intensity or gain of the output beam or beams 20 corresponding to the particular pixels within the generated frames. The output beam 20 may be scanned by the scanning reflector(s) across a plurality of pixels and lines, thereby generating an image frame at the projection surface 40. Thus, the scanning reflector(s) 31 (e.g., an actuated mirror, or a reflective prism) is positioned in the optical path of the output beam 20 to scan the output beam 20 and to direct the scanned output beam towards the projection surface 40 in the x and y direction (e.g., a raster scan). The scanned output beam 34 produces a plurality of beam spots or pixels on the projection surface 40 that are arranged across a plurality of lines that define a frame of the image. The scanned laser image is therefore composed of individual frames that are successively generated at an image frame rate R. (The image frame rate R is the frequency at which the image frames are projected.) The scanning reflector(s) 31 may be capable of generating a plurality of successive frames at the frame rate R that is not detectable by the human eye or a sensor (e.g., the integration time of the human eye), such as 50 Hz or 60 Hz, for example. Although the light source 10 and scanning reflector(s) 31 shown in FIG. 1 are illustrated as effectuating a linear optical pathway, it is noted that other optical pathways are possible, such as non-linear or segmented optical pathways.

Image frames are produced by simultaneously actuating the scanning reflector(s) 31 and modulating the optical intensity of the source. The position of the light spot(s) on the projection surface 40 (created by the scanning reflector 31) is a function of time. Thus, by modulating the intensity of the light source in synchronization with the scanning mirror, it is possible to vary the local intensity over the projection surface. If multicolor images need to be produced, multiple sources of different colors can be used (Red, Green and Blue, for example), each of them being synchronized with the scanning reflector(s) 31.

Multiple scanning approaches can be used. For example, to produce a scanning pattern of FIG. 2, the reflector(s) 31 can scan the image in two directions by using a two axis single MEMS mirror 31', or two single axis MEMS mirrors (not shown). The mirror 31' can be excited at its natural frequency in the horizontal direction (fast axis) to generate lines at high speed (typically 10 to 20 microseconds). In that case, lines are created from left to right for odd lines and from right to left for even lines. The MEMS is also actuated in the vertical direction (slow axis) to shift the lines in the vertical direction, in order to create full image frames. At the end of each frame, all the sources are switched OFF over a duration called "fly back time" to allow the MEMS based reflector(s) 31 to move in the vertical direction corresponding to the top of the image. The system is then ready to produce the next frame and the sources are switched ON again.

For example, in the case of a delay that is introduced into the signal applied to the scanning mechanism or in the signal applied to the source modulation, when generating an exemplary scanning pattern such as that shown in FIG. 2, all even lines will move horizontally in one direction (e.g., left to right) and the odd lines will move in the opposite direction (e.g., right to left). Thus, it is important to synchronize accurately the source modulation with the scanning motion of the reflector(s) 31.

It is noted that, by intentionally introducing time delays between both signals (i.e., between the signal applied to the light source and the signal applied to the scanning reflector), it is possible to produce some interesting effects on the image. As an example, introducing a positive delay on all odd lines and a similar delay of opposite sign on all even lines, will result in shifting the entire image frame in the horizontal direction. In some cases, also, one can introduce some delay that varies across the image as to intentionally introduce some image distortion, for example, in order to compensate some image distortion that could be created by the scanning mirror.

Note that other scanning approaches are also possible. As an example, lines can be written in only one direction (for instance left to right), with the light source(s) being switched OFF 50% of the time after each scanned line, to let the MEMS reflector come back to the position corresponding to the beginning of the next line. In this case, a horizontal translation can be produced by introducing the same delay on all the lines.

Note that the synchronization between the MEMS scanning mirror(s) 31' and the signal to the light source may, sometimes, involve more complex algorithms. For example, the configuration of the laser projection system can sometimes introduce image distortion which can be compensated by introducing a time delay between the two signals (i.e., between the signal to the scanning mirror and the signal to the laser(s)), that delay being changed across the image frame. In this case, a pure shift of the image (i.e., a shift, without distortion) can also be generated but requires a more complex algorithm than just introducing a constant delay on the signal(s).

Figure 3A:
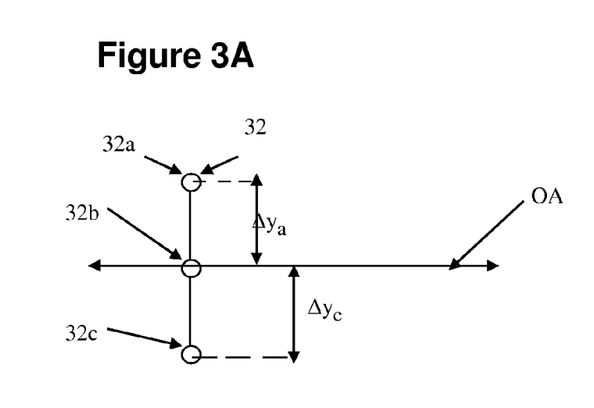
FIG. 3A illustrates schematically the virtual image shift created by a rotating polygon prism.

In order to minimize the contrast of speckle, a polygon prism 35 (that has a transparent body with an index of refraction larger than 1) is inserted in the optical path between the scanning optics and the projection surface 40. The scanned output beams are transmitted through the spinning polygon prism 35, and upon exiting the polygon prism 35 propagate toward the projection surface 40. As shown schematically in FIG. 1, the polygon prism 35 rotates. This rotation shifts laterally, as a function of time, the output beams 34 that are propagating towards the projection screen 40. Thus, as seen from the projection surface 40, the spinning polygon prism 35 creates a virtual image 32 of the scanning optics 30 (See FIG. 3A). As the polygon prism 35 rotates the position of the virtual image 32 changes as a function of time. The virtual image 32 is positioned in a plane that is located behind the polygon prism 35 relative to the projection surface 40. The spinning facets of the polygon prism 35 project the virtual image 32 onto the projection surface 40. The spinning polygon prism 35 may rotate in a clockwise or counter-clockwise direction. The rotating structure may comprise any structure known in the art to rotate optical components. As the spinning polygon prism 35 rotates, the virtual image 32 moves laterally (e.g., up and down) across the optical axis 38 as illustrated in FIG. 3A. By controlling the polygon prism 35 so that it rotates at a frequency ω (rotations/sec) that is less then the image frame rate R, the virtual image 32 is projected onto the projection surface 40 from a different position and angle of incidence at each successive frame. More specifically, the virtual image of the scanning optics 30 (e.g., mirror 31') is laterally shifted by a distance Δy with respect to the optical axis OA. The offset Δy from the optical axis OA (i.e., the amplitude of the virtual image 32 translation) is determined by the rotation angle of the polygon prism 35. For example, a pixel of the virtual image 32 is projected toward the projection surface 40 from position 32a at first frame. As the scanning reflector(s) 31 scans the output beam 20 across the remaining plurality of pixels and lines of the first frame, the spinning polygon prism 35 continues to shift the virtual image 32 about the optical axis OA. When the scanning reflector(s) 31 returns to the first pixel of the second frame, the spinning polygon prism 35 has rotated such that the pixel of the second frame now projects toward the projection surface 40 from position 32b. (See FIG. 3B.) Similarly, at the third frame, the first pixel projects from position 32c. Finally, the spinning polygon prism 35 returns to the original position of the first frame such that, at the fourth frame, the pixel of the virtual image projects from position 32a, and so on.

FIG. 3A illustrates three different positions 32a, 32b and 32c of the virtual image 32 of the scanning mirror 31', as seen from the projection screen 40. The light beams exiting the spinning polygon prism 35 are shifted by a distance Δy (and thus appear to be coming from the three different positions 32a, 32b and 32c) at three different moments in time (Ta, Tb and Tc). Thus, each particular area or point 38 of the projection screen 40 is illuminated at different incidence angles Θi at a time Ti (e.g., at time Ta the angle Θi=Θa, at time Tb the angle Θi=Θb=0 and at time Tc the angle Θi=Θc). This is shown, for example, schematically in FIG. 3B. Therefore, different speckle patterns are displayed at times Ta, Tb and Tc. That is, each point 38 of the projection screen 40 is illuminated at a different incidence angles Θi, creating speckle patterns that are varying as a function of time.

Although FIG. 3A illustrates an embodiment in which the virtual image 32 is translated at a frequency such that an individual pixel of the image is projected from three different positions, other embodiments may translate or shift the virtual image 32 at a frequency that provides for more or less than three positions. As an example, if the image frame rate R is 50 Hz, the virtual image 32 may be made to translate about the optical axis 38 at approximately 10 Hz. The scanning reflector(s) 31 should be controlled such that the virtual image 32 is projected from more than one position. The rotational motion of the spinning polygon prism 35 may be controlled by the system controller 25, or it may be controlled by a separate controller or driver.

Therefore, any given point 38 of the image situated at the projection screen 40 is illuminated at a different angle (angle Θi), for each projected frame, which reduces the speckle contrast because the eye (or the detector) is averaging different speckle patterns generated at the frame rate R. Thus, according to some embodiments of the present invention, by continuously rotating the spinning polygon prism 35 (for example at a constant speed, or constant rotation frequency ω), it is therefore possible to change the speckle pattern perceived by an observer over a frame-per-frame basis.

Although a spinning polygon prism can eliminate or minimize speckle patterns, the use of the spinning polygon prism in the laser projection system 100 can also create two issues that need to be addressed. First, if the output beams reflected by the scanning optics are intercepted by the corner(s) of the rotating polygon prism 35, this corner(s) vignettes the beams. This vignetting can give rise to unacceptable image artifacts (e.g., dark bands within the image). Second, because the polygon prism 35 is spinning, the beam propagating towards the projection screen is laterally shifting as a function of time, and, unless appropriate compensation is utilized, this will result in undesirable shifting of the projected image on the projection screen (as a function of time) and image blurring.

Correction for Beam Vignetting.

As described above, unless the laser projection system is properly designed, the beam provided by the scanning optics 30 (e.g., scanning reflector(s) 31) will intercept, for some particular rotation angle(s), the polygon prism corners. This beam interception results in beam vignetting that generates undesirable dark bands on the projection screen 40. However, a laser projection system typically needs a period of time (for example, a minimum duration of 1 mS to 5 mS,) to allow the scanning optics to move from the position corresponding to the end of frame to the position corresponding to the beginning of the next frame. This time period is referred to as the "fly back" period. During the fly back period all lasers are switched off to avoid creating image artifacts while moving or actuating the scanning reflector along the slow axis SA (see FIG. 4, for example). According to at least one embodiment, by synchronizing the rotation of the spinning polygon prism 35 with the proper motion and proper positioning of the scanning mirror 31', and by choosing the rotation frequency ω of the spinning polygon prism 35 appropriately, the corner of the polygon prism 35 (i.e., the corners where different polygon facets join one another) passes through the optical path when the lasers are turned off. Preferably the time for the corner to pass over is shorter than the fly back period. This technique eliminates the dark bands that would have been present on the projection screen 40. It is noted that the spinning polygon prism 35 may not need to be rotating at the constant frequency ω. For example, the rotation speed of the polygon prism may increase when the polygon prism's corner (the corner closest to the scanning optics) approaches the optical path in order to allow the polygon prism's corners to pass through the optical path during the fly back period, thus avoiding vignetting of the output beams.

Figure 4:
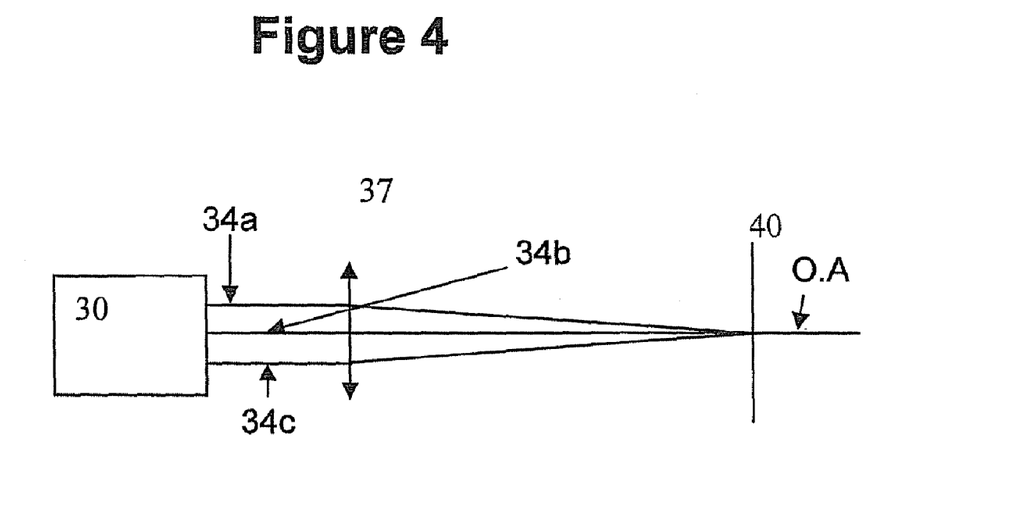
FIG. 4 is a schematic illustration that shows how the beam reflected by the scanning mirror goes though the body of the spinning polygon prism.
Figure 5:
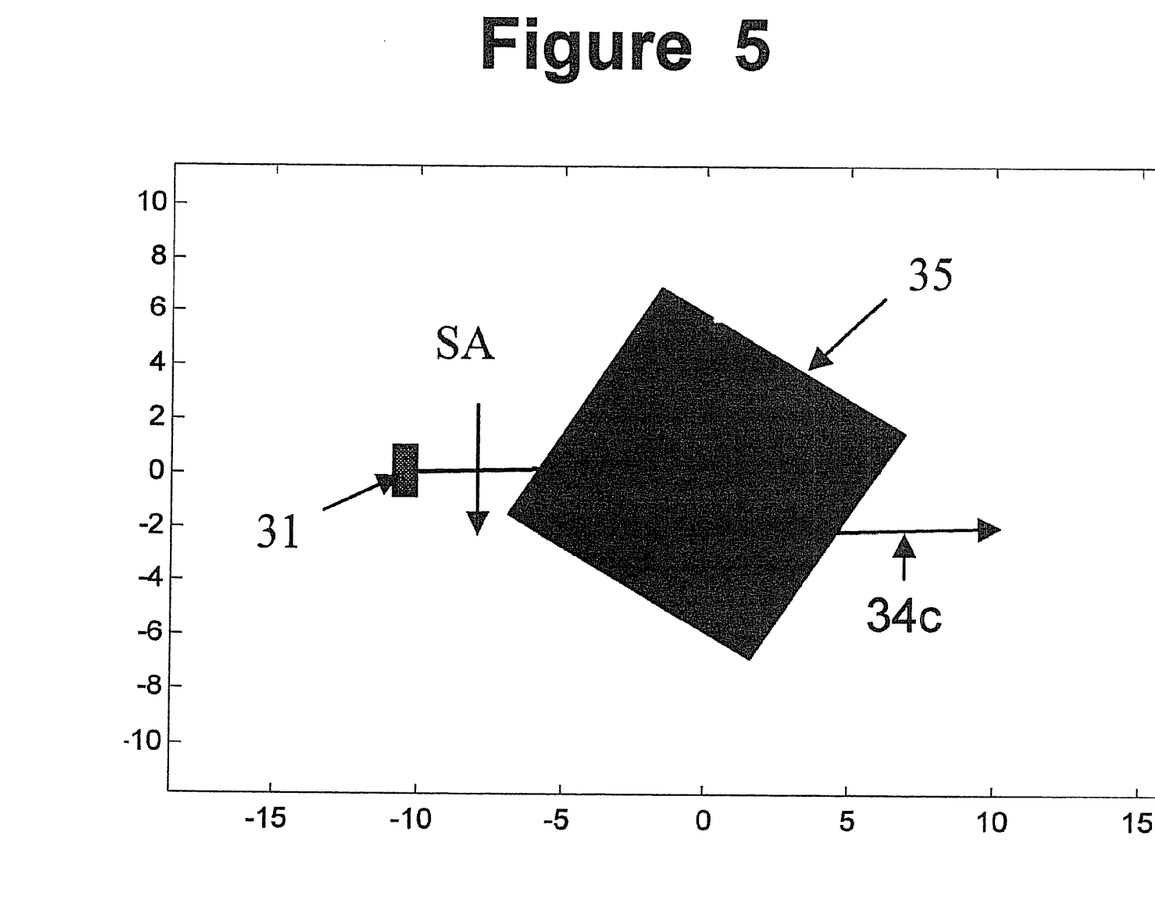
FIG. 5 a schematic illustration of a top view of another exemplary laser projection system according to one or more embodiments.

FIG. 4 illustrates one exemplary method for generating an image by the laser projection system 100 without the dark bands. The image frame is scanned by the reflector(s) 31 along the fast scanning axis to create the lines of the image. As shown in FIG. 5, the spinning polygon prism 35 is rotating along the slow axis SA of the scan; and the orientation of the polygon prism's rotation is such that the polygon prism's corner, when it intercepts the optical axis, is going in the direction that corresponds to the slow axis SA scanning direction. The reflector(s) 31 is also scanning the image frame along the slow axis SA in order to generate multiple lines. At the end of each frame, the scanning reflector 31 returns to its initial position along the slow axis in order to restart at the beginning of the next frame. As described above, during this time period the lasers are switched OFF. Thus, by calculating the polygon prism's rotation frequency ω, such that polygon prism's corner(s) crosses the optical path (i) over a duration t that is shorter than the fly back time, and (ii) while lasers are turned off, one can avoid the problem of beam vignetting by the polygon prism's corners, because no optical beams intercept the corners of the spinning polygon prism 35. Thus, in this embodiment, the rotation speed ω of the spinning polygon prism 35 is such that the corner of the polygon prism 35 passes over the optical path during the fly back time (i.e., when the lasers are turned off), for a time duration that is shorter than the fly back period.

It is noted that the scanning optics 30 need to be very fast (for example, lines are scanned in the order of 15 microseconds), thus the diameter of the scanning optics also needs to be relatively small. Thus, preferably, the diameters of the output beams 20 on the scanning optics 30 are 1 mm or smaller.

Correction for Image Shifting and Blurring.

Figure 3B:
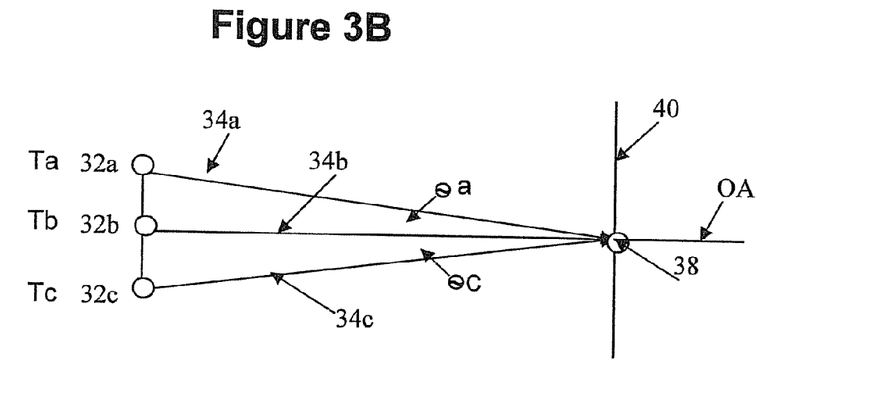
FIG. 3B illustrates schematically how the virtual image shift shown in FIG. 3A corresponds to a change in a subtended angle(s), as the virtual image is viewed from a point located the projection surface.

FIGS. 3A, 3B are schematic illustration of the lateral motion of the virtual image 32 of the scanning reflector(s) 31. The light beams 34a, 34b and 34c (see FIGS. 1 and 3B) represent three beams exiting the spinning polygon prism 35 for (i) one given angle of the mirror 31' and (ii) three different rotation angles of the spinning polygon prism 35. Because the rotation of the polygon prism 35 only generates lateral shifts in the position of the output beam(s), the output beams 34a, 34b and 34c are substantially parallel or parallel to each other.

According to one exemplary embodiment of the present invention, a lens component 37 with a focal length f is inserted into the optical path between the scanning optics 30 and the projection surface 40. (See FIG. 5, for example.) The focal length f of the lens component 37 is substantially equal to the projection distance D (i.e., in this embodiment the distance between the lens and the projection surface 40), thus the lens component substantially focuses the output beams 34a, 34b, 34c on the projection screen 40, and three output beams 34a, 34b, 34c would converge to the same point 38 on the projection screen, even though the laser projection system utilizes a rotating polygon prism. Thus, the lens component 37 eliminates the effects of the image shifts on the projection screen (as a function of time), generated by the rotation of the spinning polygon prism 35. Therefore, image blurring created image shifts that are caused by the shifted output beam(s) 34 disappear for the given projection distance D.

In other embodiments correction of image blurring can achieved by modifying the angular deflection of the scanning reflector(s) 31 by introducing a time delay in the signal to the scanning optics 30 with respect to a modulation of signal applied to the coherent light source (e.g., laser(s)). This introduced delay is described, for example, earlier in the specification, and can be accomplished for example by:

(I) Having image correction algorithms. For example the algorithm may introduce a delay on data for frame generation and may also compensate for intra-frame image distortion; and/or (II) Changing the scanning angle of the scanning reflector(s) 31 by angle θ' (e.g., θ'x, or θ'y) o as to introduce the required angular correction ΔΘ.

For example, as described above, and illustrated in FIG. 1, the rotation of the spinning polygon prism 35 generates, in first order approximation, a pure translation of the image. Because the projection system controller 25 is synchronizing the modulation of the lasers and the motion of the scanning optics, the undesired image shifts on the projection screen 40 can be eliminated (or minimized) by introducing a delay between the signal applied to the light source 10 (e.g., lasers) and the signal applied to the scanning optics 30. Thus, the output beams 34 exiting the prism 35 converge to the same point, frame by frame, because the image correction is performed by an algorithm that introduces a delay in frame generation.

According to yet another embodiment, the image blurring due to image shifts caused by the rotating polygon prism can be eliminated or minimized by adjusting the scanning angle of the scanning optics (e.g., mirror 31'). The following equations show an example of correction algorithm in the simplistic case where the laser projection system 100 is configured to scan the image in only one direction. This kind of algorithm can be easily extended to more complex scanning (e.g., two dimensional) approaches because similar equations can be utilized in the x and y directions. For example, in the embodiment corresponding to FIG. 2, where the output beam is scanned in two directions (left/right and right/left), it can be shown that similar equations can be applied, except that the correction needs to be of opposite sign between even and odd lines. The projection system 100 is also designed in such a way that the laser beam's spot size at the projection surface 40 is compatible with the targeted image resolution, in order to have the right compensation at several projection distances Di (which in this exemplary embodiment are the distances between the rotating polygon prism and the projection surface 40). Also, the image algorithm may include some interframe distortion compensation, in order to correct for residual image distortion that can be introduced by lens aberrations.

The shift of an individual beam spot or pixel on the projection surface 40 as the virtual image 32 moves relative to the optical axis 28 due to rotation of the spinning polygon prism 35 may be determined, as a first order approximation, by:

$$\Delta y(t) = L \sin(\Psi_0(t) - a \sin(\sin(\Psi_0(t))/n)) \quad (1)$$

where $\Psi_0$ is the rotation angle of the polygon prism 35; n is the index of refraction of the polygon prism 35; L is the thickness of the polygon prism 35 and Δy is the lateral image shift of the virtual image of the scanning optics. More specifically, Equation (1) indicates that the position of an individual beam spot or pixel will move on the projection surface (on a frame-per-frame basis) as a result of moving the virtual image 32, which relates to the rotational frequency ω of the polygon prism, which in turn relates to the rotation angle $\Psi_0$ of the polygon prism 35.

The position of the beam spot is also dependent on the distance D (polygon prism to the projection surface 40) and the amplitude Δy of the virtual image translation. As a first order approximation, the angular correction at a given time t, ΔΘ(t), needed to be applied on the image pixel in order to correct the pixel displacement Δy is:

$$\Delta\Theta(t) = -\Theta i(t) = -\arctan(-\Delta y(t)/D) \approx \Delta y(t)/D \quad (2)$$

where D is the screen distance (polygon to the projection surface 40). It is assumed that the distance D is much larger than L. For example, D≧10 L, or D≧20 L. It is noted that the compensation by angular correction ΔΘ is a function of the projection surface distance (D in formula (2)). Thus, the correction algorithm can then be manually or automatically modified to accommodate several distances to the projection surface 40. In addition, because the image shift is determined by the rotation of the polygon prism 35, the angular deviation can also be calculated (first approximation) by formulas (1) and (2) and corrected as a function of image shift. As an illustration, one can consider a 10 mm thick (L=10 mm) polygon prism with an index of refraction (n) of 1.8. Assuming that the rotation angle of the polygon $\Psi_0$ at an instant of time is, for instance, 30 degrees, the equation (1) gives a lateral displacement Δy of 2.16 mm. Assuming a projection distance D of 1 meter, the angular correction to apply to the scanning reflector would then be around 2.16 mRd.

That is, because the virtual image shift Δy and image shifts are determined by the rotation of the polygon prism 35, and calculated (first approximation) by Equations (1) and (2), the image shift and shift Dy can be corrected by modifying the angular deflection of the scanning reflector(s) 31 by changing the scanning angle θ'y (and/or θ'x) by angular correction corresponding to ΔΘ. Additionally, because equations (1) and (2) are not linear, if needed, finer (higher order) correction which is not linear as a function of time, may also be utilized. This higher order correction may result in introduction of delay that may vary or change across a single image frame.

Some embodiments may utilize a compensation method that comprises providing a compensation signal to the scanning reflector(s) 31, such that the image translation caused by the spinning polygon prism is being compensated for. More particularly, the compensation signal may alter angles θ'y (and θ'x) of the scanning reflector(s) 31 to compensate for the image translation so that the image is corrected on the projection surface 40. By correcting the angles θ'y (and θ'x) of the scanning optics 31, a clear and stable image is presented to the viewer.

For example, the amount of correction of the angle in the y-direction may be determined by:

$$D \tan(\theta'_0(t)) = D \tan(\theta'_y(t)) + \Delta y(t) \quad (3)$$

where:

$\theta'_0(t)$ is the angle of the scanning reflector(s) 31 if no image correction were present; D is the distance from the polygon to the projection surface 40, and $\theta'y(t)$ is the additional tilt angle that needs to be applied to the scanning reflector 31 in order to correct the image projected onto the projection surface 40 (i.e., in this embodiment the scanning reflector's angular correction for scanning reflector's scanning angle in y-direction).
Thus, $$\theta'_y(t) = \arctan\left(\frac{D\tan(\theta'_0(t)) - \Delta y(t)}{D}\right) \quad (4)$$

The above calculations may be performed by the system controller 25, which then may provide an appropriate correction signal (e.g., time delay relative to the laser(s)) to the scanning reflector(s) 31. The correction calculations depend on the distance D of the laser projection system 100 from the projection surface 40. Therefore, the distance D should be known or approximated to yield the most effective image compensation results. According to some embodiments, the laser projection system 100 may also comprise a distance detection means such as those that are known in the art. Other embodiments may prompt a user to input an approximate distance D of the laser projection system 100 to the projection surface so that the correction signal may be determined.

The correction signal is also dependent on the angle of rotation of the spinning polygon prism 35. Therefore, the angle of rotation ω should be monitored so that an accurate correction signal may be applied to the scanning reflector 31. Some embodiments may use rotation encoders to monitor the angle of rotation ω of the spinning polygon prism 35. The rotation encoders may provide the system controller 25 a signal that corresponds to an angular position of the polygon prism 35 as the spinning polygon prism 35 rotates about the optical axis. The system controller 25 may then use the signal provided by the rotation encoders to calculate the correction angles needed to compensate for any image distortion or translation.

Polygon Prism Shape Design Optimization

Figures 6A, 6B:
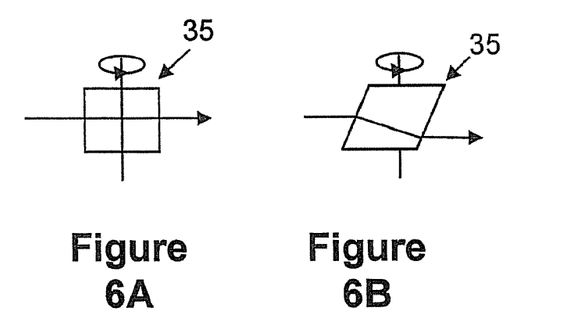
FIG. 6A-6C is a specific embodiment where the spinning prism has the shape of a rhombohedron.
Figure 6C:
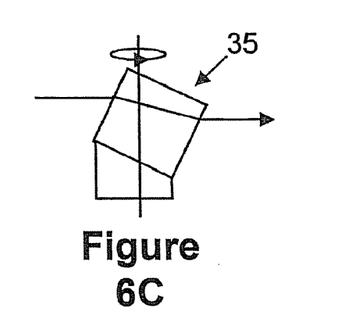

In order to have the best speckle reduction, it is preferable to design the polygon prism such that, for the smallest size, the rotation of the polygon prism creates as many independent speckle patterns as possible. Although, most of the figures illustrate a polygon cube, other polygon prism geometries are also possible. In order to create independent speckle patterns, it is preferable to increase the amount of translation created by the rotation of the polygon prism 35. For example, given the same size (and shape) of the polygon prism, a polygon prism body having a higher index of refraction n results in a larger beam shift Dy and thus provides a better speckle reduction. A regular polygon prism such as a cube (see FIG. 6A) provides virtual image translation in one single direction. By using a rhombohedron polygon prism as shown in FIG. 6B speckle can be further reduced because the output beam is shifted in the two directions. Alternatively, a cube-shaped prism mounted at an angle relative to the axis of rotation (see FIG. 6C) will also shift the virtual image in two directions (x and y). In addition, some of the polygon prism's facets may also include birefringent material(s), in order to rotate the polarization of the beam 34. As an example, the presence of a waveplate on at least one of the facets (but not all of the facets) will provide further speckle reduction. Such an exemplary waveplate may be glued or otherwise mounted directly to one or more facet surfaces of the polygon prism 35.

EXAMPLES

The invention will be further clarified by the following example.

Example 1

The following table gives an example of a possible implementation. The laser projection system 100 of this embodiment utilises a MEMS scanning mirror and a cube prism with a facet side of length L=10. The cube prism has an index of refraction n=1.8. The laser projection system 100 of this embodiment is designed to create three independent speckle patterns per facet, realising speckle reduction of √3. However, if a rhombohedra type polygon prism would be utilised, speckle reduction should be in the order of √6. In this exemplary embodiment the rotation frequency ω of the spinning cube prism is 5 Hz, and the fly back time duration needed to avoid beam vignetting is 4.5 mS (milliseconds). In general, it is preferable for the fly back time to be between 1 mS and 10 mS in duration in order to provide adequate time to avoid beam vignetting.

TABLE 1

| | | |
|---|---|---|
| Cube dimension | 1.00E−02 | meters |
| Projector frequency | 60 | Hz |
| Beam size on MEMS mirror | 1.00E−03 | meters |
| fly back time (end of frame duration) | 4.50E−03 | seconds |
| # of independent speckle/face | 3.00E+00 | |
| Index | 1.80E+00 | |
| rotation speed | 5.00E+00 | Hz |
| angular speed | 3.14E+01 | Rd/s |
| speed of cube edge | 2.22E−01 | m/s |
| edge duration within optical path | 4.50E−03 | seconds |
| tetmax | 0.785 | Rd |
| angular deviation | 3.81E−01 | Rd |
| displacement | 3.72E−03 | m |
| Scanning angle | 0.4186667 | Rd |
| scanning speed | 25.12 | Rd/s |
| ideal MEMS/cube distance | 8.84E−03 | meters |

Thus, according to some embodiments, a laser projection system 100 comprises:
(i) a coherent light source 10, configured to emit an output beam carrying signal data; and
(ii) scanning optics 30, said the scanning optics comprised at least one scanning reflector 31; and
(iii) a rotating polygon prism 35; wherein
  (a) the scanning reflector 31 is positioned in an optical path of the output beam and configured
    to direct the output beam towards the polygon prism 35, and
    to scan the output beam across a projection surface to generate an image frame; and
  (b) the polygon prism 35 is configured
    to transmit the scanned output beam through its body, and
    to create a virtual image of the scanning reflector 31, and said virtual image of the scanning reflector 31 is moving when said polygon prism 35 rotates. Preferably light source 10 includes at least one laser. The laser projection system 100 of claim 1, wherein said virtual image of the scanning reflector 31 is moving when said polygon prism 35 rotates and, to some embodiments of the laser projection system 100: a.) an image correction algorithm induces a delay in the data provided to at least one laser; and/or
b.) an image correction algorithm induces a delay to the signal controlling the movement of the scanning reflector 31. According to some embodiments the output beam passes through different polygon prism's surfaces when the polygon prism rotates, defining a plurality of distinct prism exit positions for the output beams that directed towards a common pixel portion of the image frames.

For the purposes of describing and defining the present invention it is noted that the term "substantially" is utilized to represent the inherent degree of uncertainty that may be attributed to any quantitative comparison, value, measurement, or other representation.

It is noted that recitations herein of a component of the present invention being "programmed" in a particular way, "configured" or "programmed" to embody a particular property or an algorithm, or function in a particular manner, are structural recitations as opposed to recitations of intended use. More specifically, the references herein to the manner in which a component is "programmed" or "configured" or performs according to an algorithm denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A laser projection system comprising:
   (i) a coherent light source including at least one laser configured to emit an output beam;
   (ii) a scanning optics, the scanning optics comprising at least one scanning reflector, the scanning reflector positioned in an optical path of the output beam; and
   (iii) a rotating polygon prism; wherein:
      (a) the scanning reflector is configured to direct the output beam towards the polygon prism and scan the output beam across a projection surface to generate a projected image comprising successive image frames; and
      (b) the polygon prism is configured to transmit the scanned output beam through its body, and create a virtual image of the scanning reflector, such that said virtual image of the scanning reflector laterally moves within a plane and is projected onto the projector surface at a different incident angle $\Theta$ at each successive image frame such that a different speckle pattern is generated at each successive image frame as said polygon prism rotates, thereby reducing speckle contrast in the projected image at the projection surface.

2. The laser projection system of claim 1, wherein said output beam passes through different polygon prism's surfaces when said polygon prism rotates, defining a plurality of distinct light beam prism exit positions for the output beams directed towards a common pixel portion of an image frame.

3. The laser projection system of claim 1, the laser projection system further including an image correction algorithm that induces a time delay between the signal provided to said at least one laser and the signal controlling the movement of said scanning reflector.

4. The laser projection system of claim 3, the laser projection system including:
   a.) an image correction algorithm that induces a time delay in the signal provided to said at least one laser; and/or
   b.) an image correction algorithm that induces a time delay to the signal controlling the movement of said scanning reflector.

5. The laser projection system of claim 1, further including a lens component situated between said rotating polygon prism and a projection surface.

6. The laser projection system of claim 5, wherein said lens component has a focal length f, said focal length f approximately equals to the distance from said lens to said projection surface.

7. The laser projection system of claim 5, wherein the laser projection system further including a controller structured to:
   a.) introduce a delay in the data provided to said at least one laser when the projection surface is moved away from its nominal position; and/or
   b.) introduce a delay to the signal controlling the movement of said scanning reflector when the projection surface is moved away from its nominal position.

8. The laser projection system of claim 1 wherein, a first order angular correction at a time t, $\Delta\Theta(t)$, applied on an image pixel in order to correct the image pixel displacement $\Delta y$ is:

$$\Delta\Theta(t) \approx -\Delta y(t)/D,$$

where D is the distance from the polygon prism to the projection surface.

9. The laser projection system of claim 8, wherein $D \geq 10 L$, where L is the polygon prism's thickness.

10. The laser projection system of claim 1 wherein, first order angular correction at a given time t, $\Delta\Theta(t)$, applied on the image pixel in order to correct the image pixel displacement $\Delta y$ is:

$$\Delta\Theta(t) = -\arctan(-\Delta y(t)/D),$$

where D is the distance from the polygon prism to the projection surface.

11. The laser projection system of claim 10, wherein $D \geq 10 L$, where L is the polygon prism's thickness.

12. The laser projection system of claim 1, wherein the amount of the scanning reflector's angular correction for scanning reflector's scanning angle in y-direction is:

$$\theta'_y(t) = \arctan(|-D\tan(\theta'_0(t) - \Delta y(t))/D) - |$$

where: $\theta'_0(t)$ is the angle of the scanning reflector if no image correction were present; and D is the distance from the polygon prism to the projection surface.

13. The laser projection system of claim 1, wherein a corner of the rotating polygon prism passes through the optical path when said at least one laser is turned off.

14. The laser projection system of claim 1, wherein said polygon prism has rotation frequency such that a corner of the rotating polygon prism passes through the optical path during the fly back period.

15. The laser projection system of claim 14, wherein the fly back period duration is 1 mS to 10 mS.

16. The laser projection system of claim 1, wherein a birefringent material is situated on at least one surface of the polygon prism.

17. The laser projection system of claim 1, wherein a wave-plate is situated on at least one facet of the polygon prism.

18. The laser projection system of claim 1, wherein said at least one laser is configured to emit a substantially collimated laser beam, said laser beam having an outer beam diameter of 0.5 mm to 1.5 mm.

19. A laser projection system comprising:
(i) a coherent light source including at least one laser configured to emit an output beam;
(ii) a rotating polygon prism having a substantially transparent body; and
(iii) a scanning optics situated between said coherent light source and said rotating polygon, said scanning optics comprising at least one scanning reflector and situated (a) to intercept the output beam provided by the coherent light source, (b) to direct the output beam towards the polygon prism, and (c) to scan the output beam across a projection surface, wherein the polygon prism is configured to transmit the scanned output beam through its body such that a rotation of the polygon prism changes an angle of incidence $\Theta$ of the scanned output beam such that a virtual image of the at least one scanning reflector laterally moves within a plane and is projected upon the projection surface to vary a speckle pattern at the projection surface over time, thereby reducing speckle contrast produced by the scanned output beam at the projection surface.

20. The laser projection system of claim 19, wherein the laser projection system further including at least one controller structured to:
a.) introduce a delay in the data provided to said at least one laser; and/or
b.) introduce a delay to the signal controlling the movement of said scanning reflector; and wherein the rotating polygon prism passes through the optical path when said at least one laser is turned off.

* * * * *